United States Patent [19]

Ishimoto et al.

[11] Patent Number: 5,051,636
[45] Date of Patent: Sep. 24, 1991

[54] DYNAMIC ELECTRIC MACHINE

[75] Inventors: Noriyuki Ishimoto, Aichi; Hirofumi Iida, Obu, both of Japan

[73] Assignee: Sumitomo Heavy Industries, Ltd., Tokyo, Japan

[21] Appl. No.: 516,630

[22] Filed: Apr. 30, 1990

[51] Int. Cl.⁵ .............................................. F16H 33/10
[52] U.S. Cl. ....................................... 310/90; 310/91; 310/51; 411/34; 411/71
[58] Field of Search ........................ 310/90, 89, 88, 85, 310/66, 51, 91, 42, 43; 248/603, 635; 16/2; 411/34, 37, 38, 36

[56] References Cited

U.S. PATENT DOCUMENTS

| | | | |
|---|---|---|---|
| 2,365,372 | 12/1943 | Allen | 16/2 |
| 2,788,386 | 9/1957 | McCarty | 16/2 |
| 4,425,813 | 1/1984 | Wadensten | 310/91 |
| 4,563,118 | 7/1986 | Liljedahl | 411/34 |

FOREIGN PATENT DOCUMENTS

| | | | |
|---|---|---|---|
| 1225565 | 5/1959 | France | 310/91 |
| 63-4156 | 1/1988 | Japan | |
| 700379 | 12/1953 | United Kingdom | 411/34 |
| 866258 | 4/1961 | United Kingdom | 411/34 |

OTHER PUBLICATIONS

Patent Abstracts of Japan, vol. 12, No. 342, Sep. 14, 1988.

Primary Examiner—Steven L. Stephan
Assistant Examiner—Matthew Nguyen
Attorney, Agent, or Firm—Armstrong, Nikaido, Marmelstein, Kubovcik, & Murray

[57] ABSTRACT

A dynamic electric machine such as a totally-enclosed fan-cooled machine has an end bracket having a plurality of seats to which a cover such as a fan cover is fixed through a plurality of generally cylindrical rubber bushings. The bushing has a nut embedded therein near one end thereof and an outer peripheral flange portion formed on the other end thereof. With the cover being placed on the flange portions, bolts are driven into the nuts from the outer side of the cover so as to fix the cover to the seats through the rubber bushings.

2 Claims, 4 Drawing Sheets

DYNAMIC ELECTRIC MACHINE

BACKGROUND OF THE INVENTION

1. Field of the Invention

The present invention relates to a construction of a dynamic electric machine such as a totally-enclosed fan-cooled machine.

2. Description of the Related Art

Referring to FIG. 1, a totally-enclosed fan-cooled dynamic electric machine has a stator which is composed of a substantially cylindrical stator frame 1, stator cores 2 provided on the inner peripheral surface of the stator frame 1 and stator coils 3 wound on these stator cores 2. The machine also has a rotor 5 carried by a rotor shaft 6 and disposed inside the stator. The rotor shaft 6 is rotatably supported by bearings 7 which in turn are supported by end brackets 4 fixed to both ends of the stator frame 1. A cooling outer fan 8 is fixed to an end of the rotor shaft 6 extended to the outer side of the stator frame 1. An outer fan cover 9 is fixed by means of bolts 11 to seats 10 which are provided on the end bracket 4.

This type of dynamic electric machines have suffered from problem in that unpleasant noise is generated during operation due to resonance of the outer fan cover 9 caused by various factors such as mass unbalance of the rotor 5, electromagnetic vibration of the motor including high-frequency component generated during driving of the machine through an inverter, and, when the machine is a geared motor, mechanical vibration caused by meshing gears.

The following methods have been proposed in order to obviate the above-described problem.

(1) Method 1

To use a vibration damping material as the material of the outer fan cover.

(2) Method 2

To use vibration damping rubber in a manner shown in FIGS. 2a, 2b, 2c or 2d. Referring to FIG. 2a, a cylindrical vibration damping rubber member 12 is provided with a circumferential groove 12a and is received in a hole formed in the outer fan cover 9 such that, the brim of the hole fits in the circumferential groove 12a. A bolt is driven through a washer and the rubber member 12 into a threaded bore formed in the seat 10, whereby the outer fan cover 9 is fixed. Referring to FIGS. 2b, 2c and 2d, a vibration damping rubber member 12' is bent in a U-like form and a projection is formed on one of the web portions of the bent rubber member 12' so as to fit in a hole formed in the outer fan cover 9. The outer fan cover 9 is clamped by the vibration damping rubber 12' and a bolt is driven through a washer and the web portions of the rubber member 12' thereby fixing the outer fan cover to the seat 10.

(3) Method 3

The outer fan cover is fixed to seats through plastic mounting pieces, as disclosed in Japanese Utility Model Unexamined Publication No. 63-4156.

The method 1 mentioned above is impractical in that the cost is raised because the entire outer fan cover is made of a vibration damping material which is rather expensive.

In the method 2 mentioned above, it is necessary that the outer fan cover and the seat are completely separated from each other through the vibration damping rubber, because the resonance prevention effect fails if direct contact between these members is allowed. In consequence, an impractically long time is required for the assembly.

The method 3 also has a problem in that it is difficult to make the strength and vibration damping effect compatible.

SUMMARY OF THE INVENTION

Accordingly, an object of the present invention is to provide an inexpensive low-noise dynamic electric machine which can operate with a reduced level of noise by prevention of vibration of the outer fan cover and which can be assembled with a high efficiency.

To this end, according to the present invention, there is provided a dynamic electric machine having an end bracket having a plurality of seats to which a cover is fixed, comprising: a plurality of generally cylindrical rubber bushings, each the bushing having a nut embedded therein near one end thereof and an outer peripheral flange portion formed on the other end thereof, the cover being placed on the flange portions; and bolts driven into the nuts from the outer side of the cover so as to fix the cover to the seats through the rubber bushings.

When the bolt is tightened, the rubber between the nut and the flange is axially compressed to expand radially so as to fix the cover to the seats.

Other features and advantages of the present invention will become clear from the following description.

DESCRIPTION OF THE PREFERRED EMBODIMENTS

An embodiment of the present invention will be described with reference to the accompanying drawings.

Figure 1:
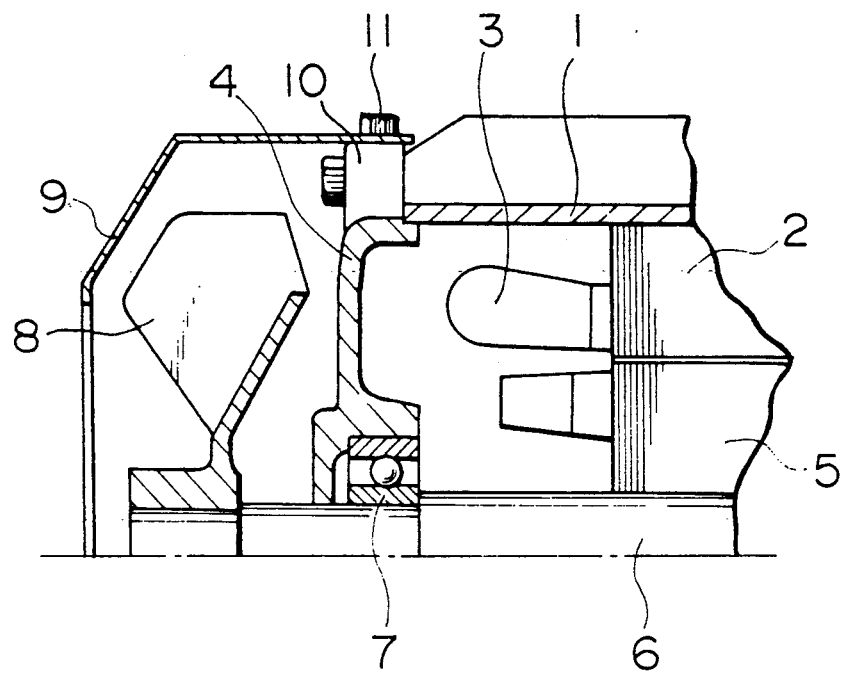
FIG. 1 is a partly-sectioned side elevational view of an essential portion of a totally-enclosed fan-cooled dynamic electric machine.
Figure 3:
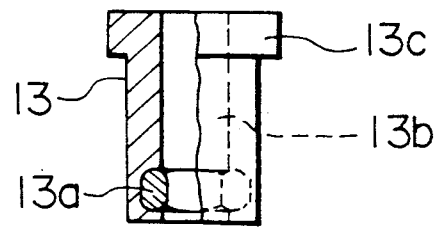
FIG. 3 is a partly-sectioned side elevational view of a rubber bushing of the present invention.
Figure 2A:
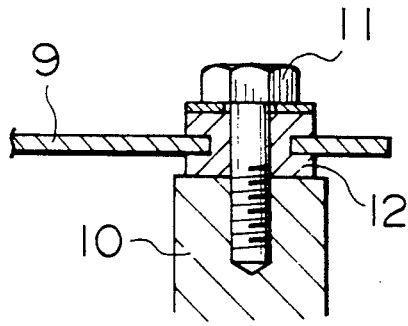
FIGS. 2a and 2b are sectional views of different types of conventional vibration damping means.
Figure 2B:
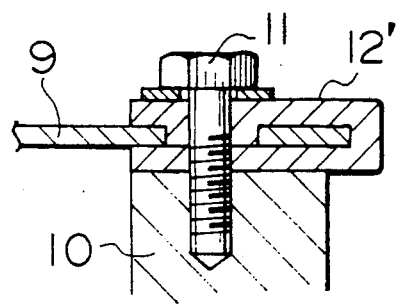
Figure 2C:
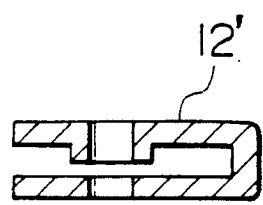
FIGS. 2c and 2d are a front elevational view and a plan view of a conventional vibration damping rubber member.
Figure 2D:
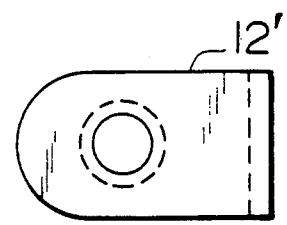

FIGS. 3 to 6b show a structure for fixing an outer fan cover 9 to seats 10 on an end bracket 4 of a totally-enclosed fan-cooled dynamic electric machine which is materially the same as that shown in FIG. 1. The structure employs a plurality of rubber bushings 13. As shown in FIG. 3, each rubber bushing 13 has a generally cylindrical form with an internal bore 13b. A nut 13a is embedded in the rubber bushing such that the threaded surface of the nut is exposed in the bore 13b. A flange portion 13c is formed on the upper peripheral surface of the rubber bushing 13.

Figure 4A:
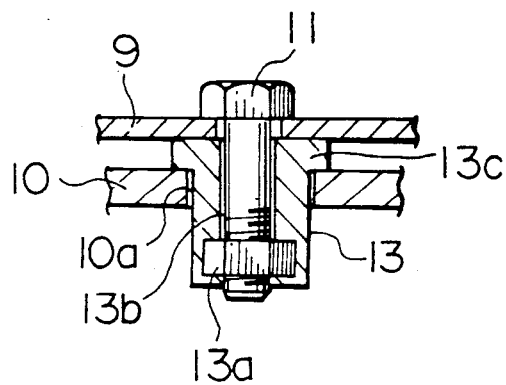
FIGS. 4a and 4b are sectional views of the bushing in the states before and after tightening a bolt.
Figure 4B:
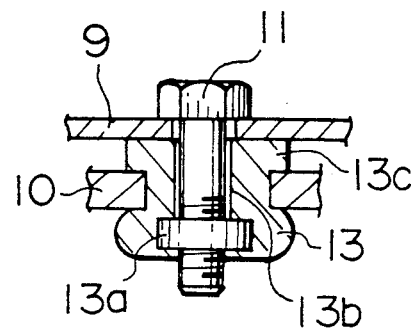
Figure 5A:
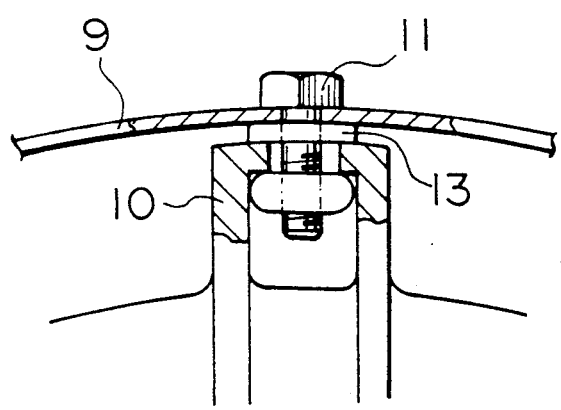
FIG. 5a, 5b and 6a, 6b are sectional views showing the bushings in different states of tightening.
Figure 5B:
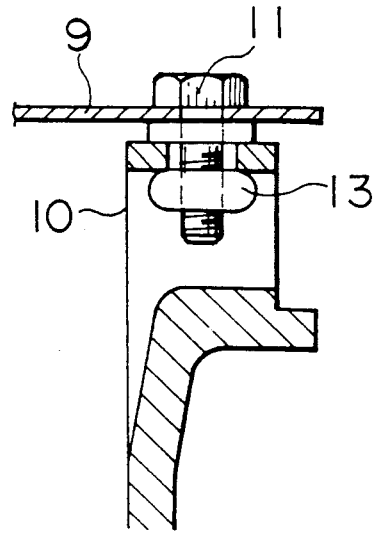
Figure 6A:
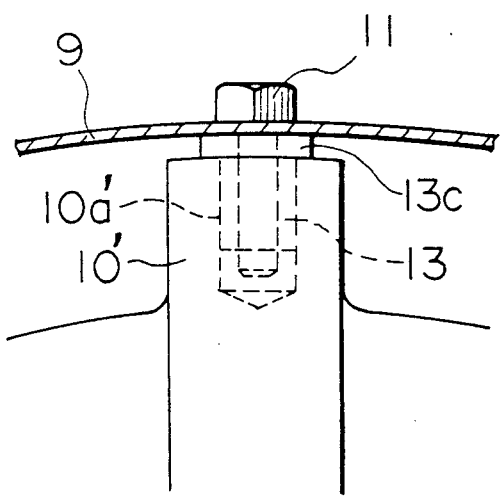
Figure 6B:
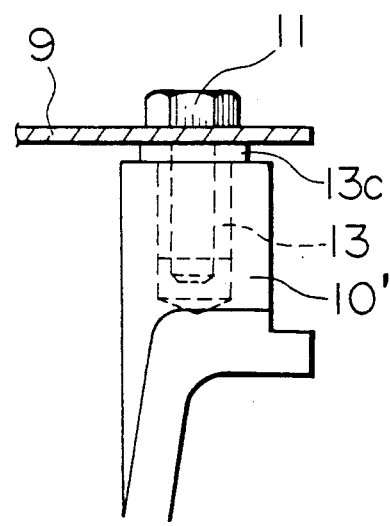

Referring to FIG. 4a, a rubber bushing 13 is made to fit in a bolt hole 10a formed in the seat 10 with the flange portion 13c clamped between the outer fan cover 9 and the seat 10. Then, a bolt 11 is driven into the nut 13a from the outside of the outer fan cover 9. As the bolt 11 is tightened, the portion of the rubber between the nut 13a and the flange portion 13c is axially compressed so as to expand radially outwardly, so that the seat 10 is clamped between the flange portion 13c and the radially expanded portion of the bushing 13 as shown in FIG. 4b, whereby the outer fan cover 9 is fixed to the seat in a manner shown in FIGS. 5a and 5b. FIGS. 6a and 6b show a different fixing method. In this method, a hole 10'a with a bottom is formed in the seat 10' on the end bracket 4. The rubber bushing 13 is inserted into the hole 10'a with the flange portion 13c thereof clamped between the outer fan cover 9 and the seat 10'. Then, the bolt is screwed into the nut (not shown) from the outer side of the outer fan cover 9. Consequently, the portion of the rubber bushing between the nut and the flange portion 13c is axially compressed and radially expanded to press the wall surface of the hole 10'a.

Thus, according to the invention, the outer fan cover 9 can be secured to the seats 10 on the end bracket 4 such that the outer fan cover 9 is completely isolated from the seats 10 by the presence of the flange portions 13c of the rubber bushings, whereby a large vibration suppressing effect is produced.

Although a mounting structure for a fan cover of a totally-enclosed fan-cooled dynamic electric machines has been specifically described, it is to be understood that the invention can effectively be applied to the mounting of various covers of various dynamic electric machines such as an outer fan cover of a reducer, air deflector of an open drip-proof electric machine and so forth.

As has been described, according to the invention, a cover of a dynamic electric machine is attached to seats on the end bracket of the machine in such a manner that the cover is completely isolated from the seats by the rubber bushings. Transmission of vibration from the inside of the machine to the cover, therefore, is remarkably suppressed by the rubber bushings, so that the noise is reduced appreciably.

Furthermore, the production cost is reduced and the assembly is facilitated.

Although the invention has been described through specific terms, it is to be understood that the described embodiment is only illustrative and various changes and modifications are possible within the scope of the invention which is limited solely by the appended claims.

What is claimed is:

1. A dynamic electric machine having an end bracket having a plurality of seats to which a cover is fixed, comprising:
   a plurality of generally cylindrical rubber bushings, each said bushing having
      a bore extending therethrough,
      a nut entirely embedded there inside near one end of the bore, and
      an outer peripheral flange portion formed at another end of the bore, said cover being placed on said flange portions; and
   bolts driven into said nuts from an outer side of said cover so as to fix said cover to said seats through said rubber bushings.

2. A dynamic electric machine having an end bracket having a plurality of seats to which a cover is fixed comprising:
   a plurality of generally cylindrical rubber bushings, each said bushing having
      a bore extending therethrough forming first and second open ends,
      a nut completely embedded inside said bushing near said first open end, and
      an outer peripheral flange portion formed at said second open end, said cover being placed on said outer peripheral flange portion; and
   bolts driven into said nuts from an outer side of said cover wherein a portion of each said bushing between said nut and said outer peripheral flange portion is axially compressed to expand radially outward to fix said cover to said seats.

* * * * *